United States Patent [19]
Saruta

[11] Patent Number: 5,187,688
[45] Date of Patent: Feb. 16, 1993

[54] METHOD OF COUNTING THE NUMBER OF PASSERS-BY

[75] Inventor: Makoto Saruta, Hiratsuka, Japan
[73] Assignee: NCR Corporation, Dayton, Ohio
[21] Appl. No.: 864,459
[22] Filed: Apr. 6, 1992
[30] Foreign Application Priority Data
  May 2, 1991 [JP] Japan .................................. 3-128301
[51] Int. Cl.⁵ .............................................. G01S 15/00
[52] U.S. Cl. ....................................... 367/96; 367/99; 367/108
[58] Field of Search ................. 367/96, 99, 108; 377/6
[56] References Cited
  U.S. PATENT DOCUMENTS
  4,528,679 7/1985 Shahbaz et al. ...................... 367/108
  FOREIGN PATENT DOCUMENTS
  330921 11/1990 Japan .

Primary Examiner—Daniel T. Pihulic
Attorney, Agent, or Firm—Albert L. Sessler, Jr.

[57] ABSTRACT

A passage is periodically scanned by a plurality of ultrasonic transmitters/receivers (sensors) arranged on the ceiling of the passage in two lines to calculate the height of an object to be measured to each sensor and the presence or absence of the measured object(s), moving direction(s) thereof, and the number thereof are reckoned from changes in sensed height and sensing time for each sensor induced by passing an object to be measured through the passage, and the position and a change in position with time of each sensor which senses the measured object concerned to count the number of passers-by in each moving direction. The presence or absence of the object to be measured and the number to be counted are decided in accordance with changes in sensed position and sensed height and the interrelation thereof, so that the number of sensors can be reduced and the number of passers-by can be counted at a high accuracy even when a plurality of persons pass under the sensors in a group.

9 Claims, 15 Drawing Sheets

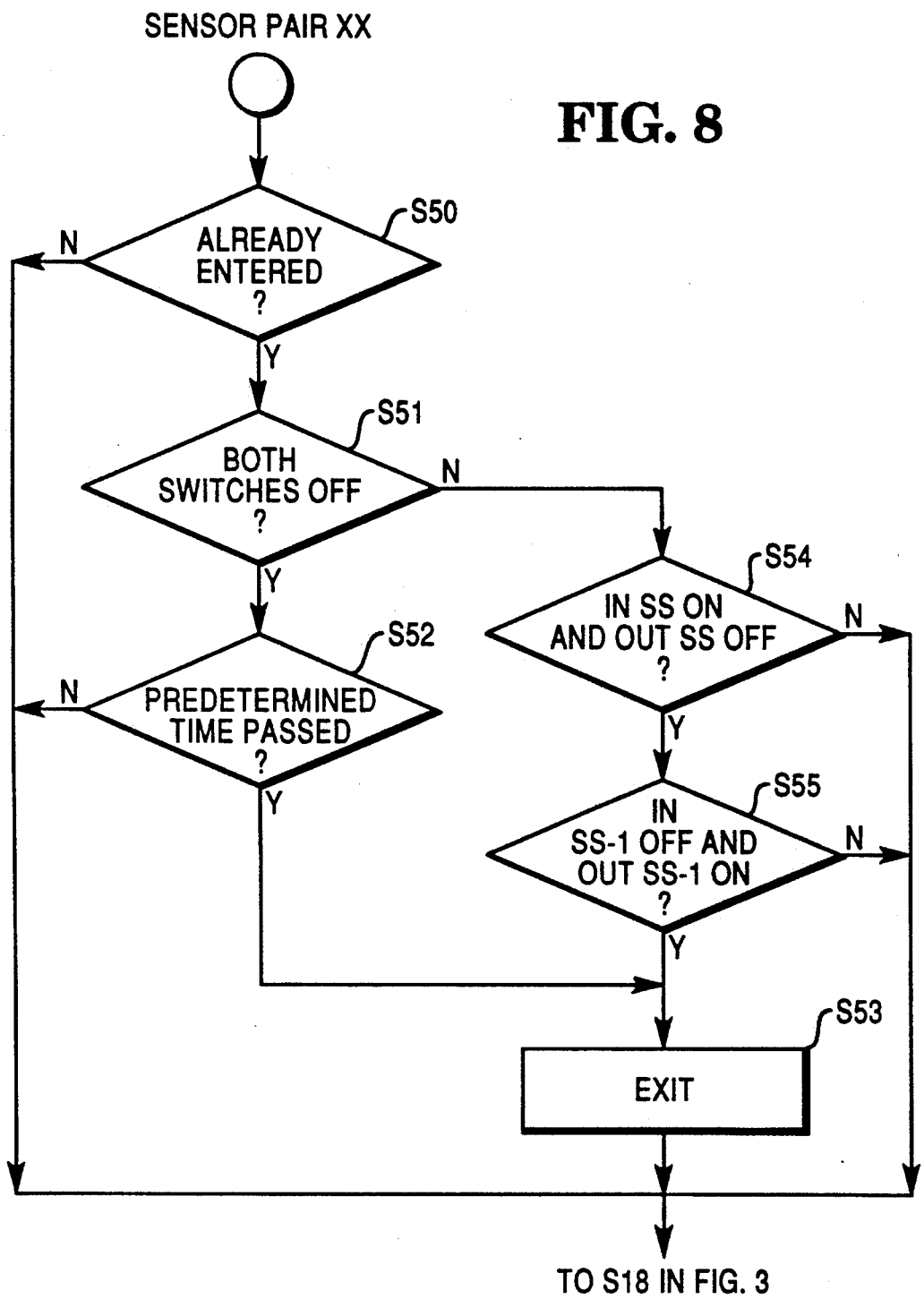

5,187,688

METHOD OF COUNTING THE NUMBER OF PASSERS-BY

BACKGROUND OF THE INVENTION

The present invention relates to a method of counting the number of passers-by, that is, a method of automatically counting the number of persons who come in and go away from department stores, movie theaters, concert halls and various meeting places.

As a method of counting the number of passers-by in a predetermined place, conventionally, there have been proposed a method utilizing optical detecting means, a method utilizing an infrared sensor, and a method utilizing a supersonic sensor and the like. However, these methods have such a drawback that the counting accuracy is reduced in a case that a plurality of persons who pass in a group is to be measured.

Accordingly, the Japanese patent application Serial No. 330921/90 entitled "Method of Counting the Number of Passers-by" and filed by the applicant of the present invention on Nov. 30, 1990, discloses an invention in which a plurality of ultrasonic transmitters/receivers (sensors) are juxtaposed in two files relatively adjacent to one another above a passage in a direction traversing the passage in such a manner that the height of an object to be measured which passes under the sensors is calculated from the time of arrival of reflected waves of the ultrasonic waves and the top (head) of the measured object is detected from changing states of the height data measured by the individual sensors in a lateral direction (a passage traversing direction) to count the number of passers-by, thereby to increase the counting accuracy.

However, in the above mentioned prior art, the head top is calculated from the changing state of the height data in the lateral direction upon each scanning operation, so that the individual sensor should be installed relatively close to one another, which induces an increase in cost of the apparatus embodying this method.

The present invention has been contemplated in view of the above-mentioned drawback associated with the prior art.

SUMMARY OF THE INVENTION

According to the present invention, there is provided a method of counting the number of passers-by who pass through a predetermined region using a plurality of sensors arranged in pairs, each sensor having a sensing switch associated therewith for indicating the sensing state of each sensor, comprising the following steps: collecting height data relating to passers-by from each sensor; provisionally determining the condition of the sensing switches and updating peak data stored in a memory; correcting the sensing state of the sensing switches and re-updating the peak data; updating counts in the data memory; verifying whether a newly entered sensor pair and an adjacent sensor pair sense one person or not; updating an identify flag for an already entered sensor pair; determining whether an entered sensor pair indicates an exit condition; determining the number to be counted in accordance with the interrelation between adjacent sensor pairs for an exit; counting a number in accordance with the moving direction of a passer-by; and initializing the sensor pairs which indicate exit.

An object of the present invention is to provide a method of counting the number of passers-by, by which the number of required sensors can be reduced and the sensing accuracy can be improved.

Another object, in a method of counting the number of persons using ultrasonic waves, is to reduce the number of ultrasonic sensors in a counting apparatus and to improve the counting accuracy.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 8 is a flowchart of sensing a passed (EXIT) state for each sensor pair.

DETAILED DESCRIPTION

Figure 1:
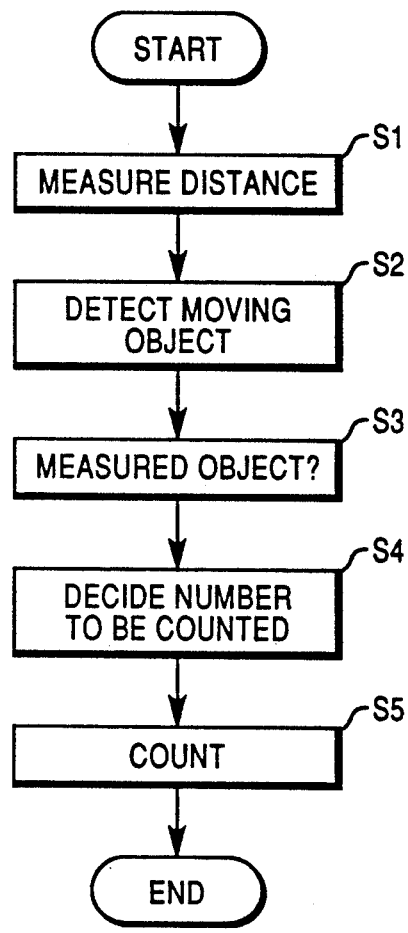
FIG. 1 is a flowchart illustrating the outline of the method of the present invention.

FIG. 1 is a flowchart schematically showing the flow of the method according to the present invention. First, the distance between each sensor and a wave-reflecting object is measured by the sensors (S1). Next, a moving object passing under the sensors is detected from a change in distance to the wave-reflecting object (S2). Then, it is verified whether the moving object is an object to be measured or not (S3). If it is an object to be measured, the number to be counted is determined in accordance with the sensing state of each sensor (S4). The number thus determined is counted (S5).

In the present invention, the lateral changing state of the height data of each sensor and the time-passing change of the height data of each sensor are consolidated and judged to recognize the moving object to be sensed, to confirm the moving direction thereof and to determine the number to be counted, so that the head top detection is not needed, unlike in the prior art, and hence the distance between the individual sensors can be widened about two times as long as the distance in the prior art.

Figure 2:
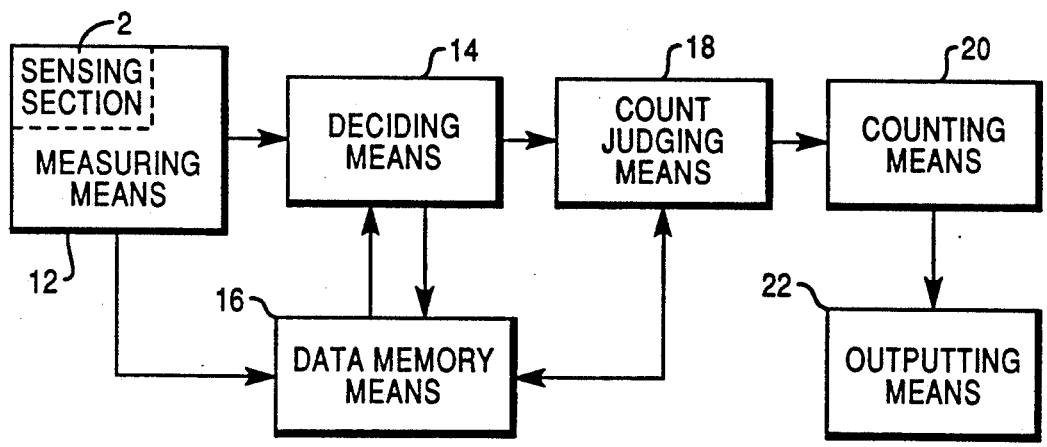
FIG. 2 is a block diagram of means for embodying the method of the present invention.

FIG. 2 is a block diagram of means for embodying the method of the present invention.

Measuring means 12 includes a sensing section provided above a passage. Both sides of the passage are partitioned by walls and a passing route is defined such that all the passers-by pass under the sensing section provided above the passage. In the sensing section, there are provided a plurality of ultrasonic sensors 2 which are linearly lined up in two files fully across the passage.

First, the distance between each sensor in the sensing section provided above the passage and the floor surface or a moving object is measured by the measuring means 12. The distance data measured for each sensor is converted into the data on height above the floor level and the peak value of the height data is calculated from the time-passing change of the height data. The height data, the peak data and the like are stored in a data memory means 16 to be sequentially updated and are transmitted to sensing deciding means 14. The sensing deciding means 14 decides whether a moving object which can satisfy a predetermined condition is present or not under each sensor for each sensor in accordance with the height data and the peak data. In order to indicate the sensing states of the individual sensors, a sensing switch (not shown, which may be a software tool such as a flag or the like) is provided for each sensor.

The state of the sensing switch which is decided by the sensing deciding means 14 is transmitted to count judging means 18. The count judging means 18 analyzes the sensing states of the sensing switches of the adjacent sensors to estimate the number of moving objects which are actually present under the whole sensing section and to determine the number to be counted. A result of judgement by the count judging means 18 is transmitted to counting means 20 as a count signal. The counting means 20 counts up the number in accordance with the count signal from the count judging means 18. The number thus counted up is displayed or printed by outputting means 22.

Next, the embodiment of the present invention will be described in more detail with reference to FIGS. 3 to 18.

Collection of Height Data

Figure 3:
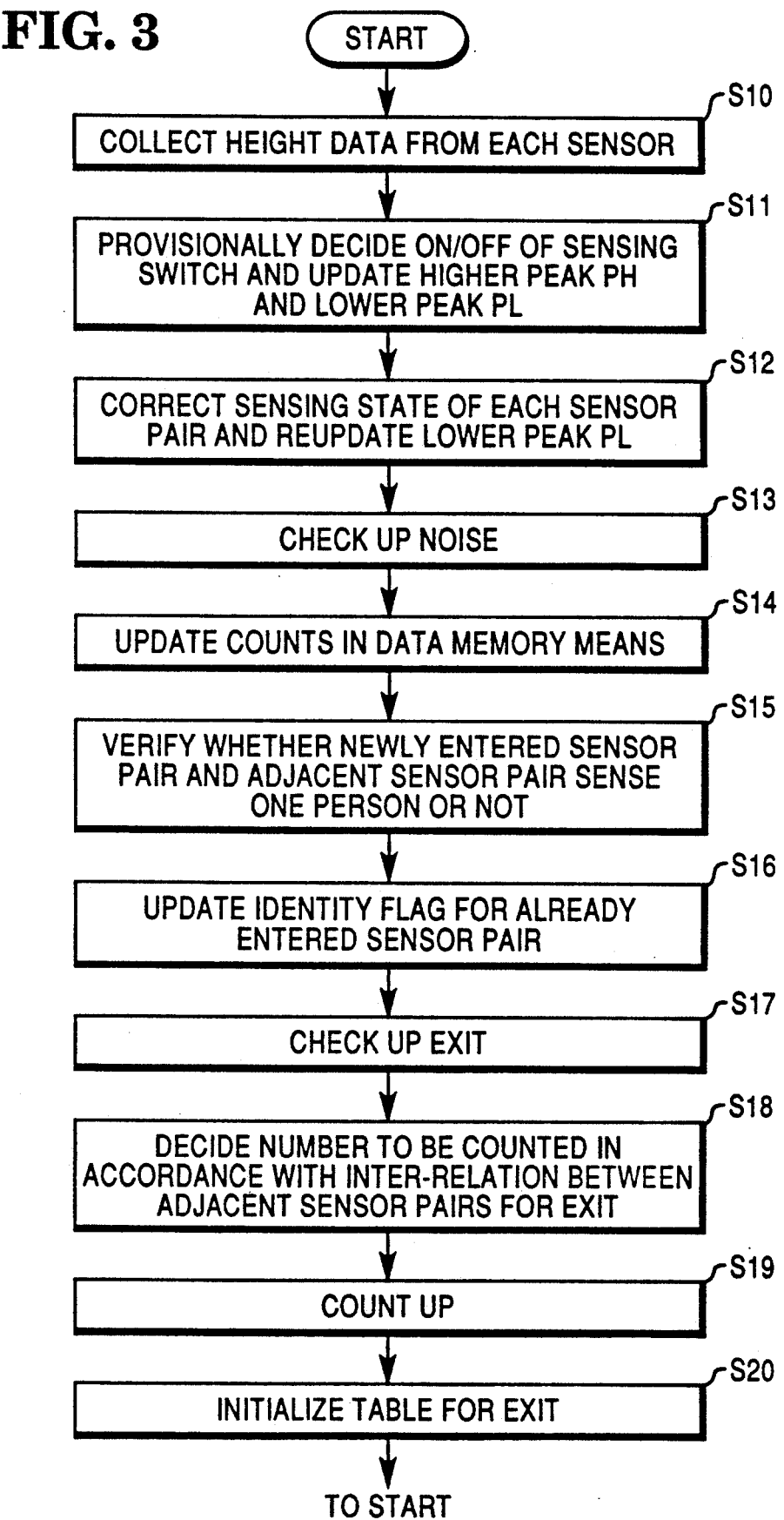
FIG. 3 is a flowchart illustrating the procedures of a process of counting the number of passers-by according to an embodiment of the present invention.
Figure 4:
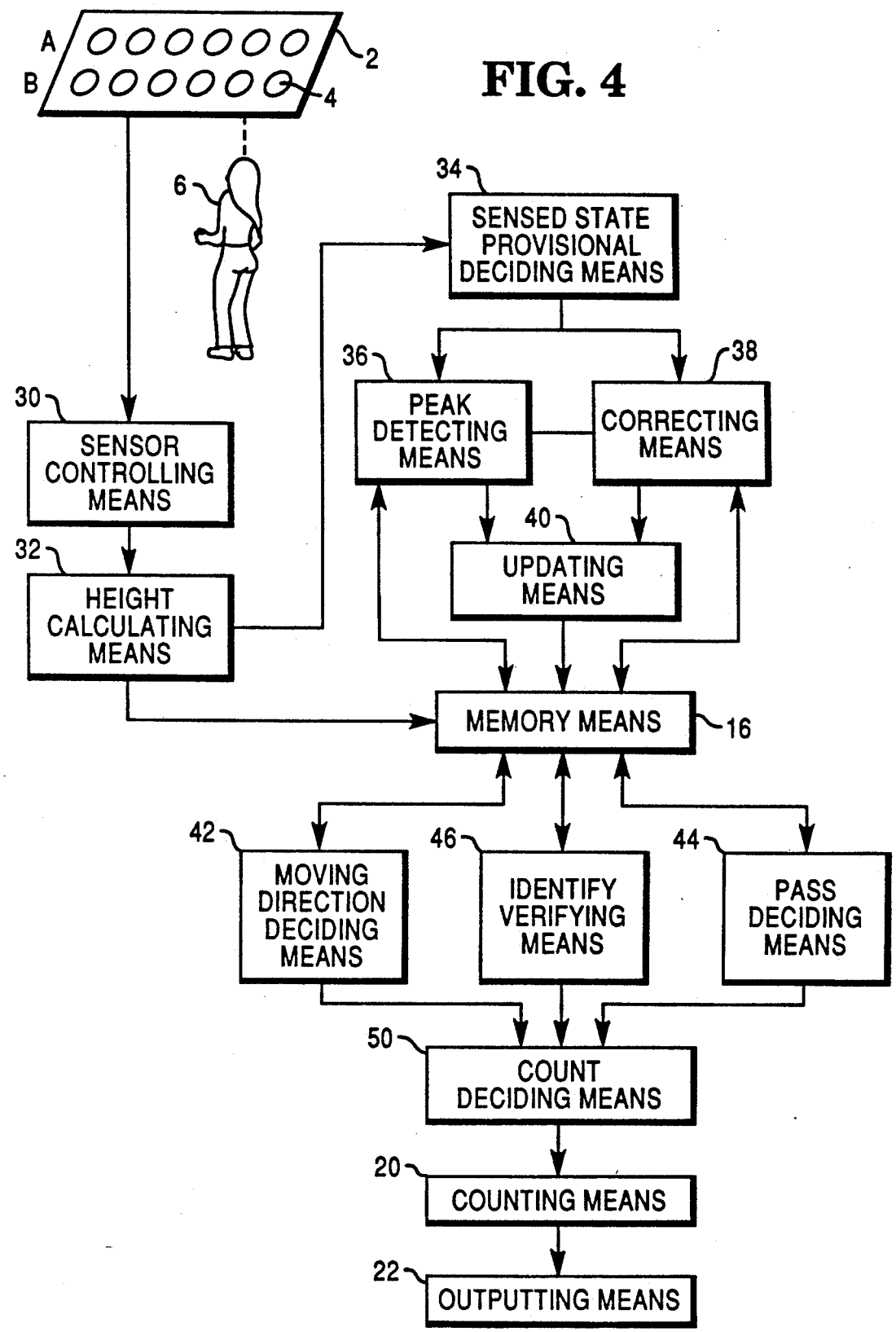
FIG. 4 is a block diagram of an embodiment, showing the arrangement in FIG. 2 in more detail and more concretely.
Figure 5:
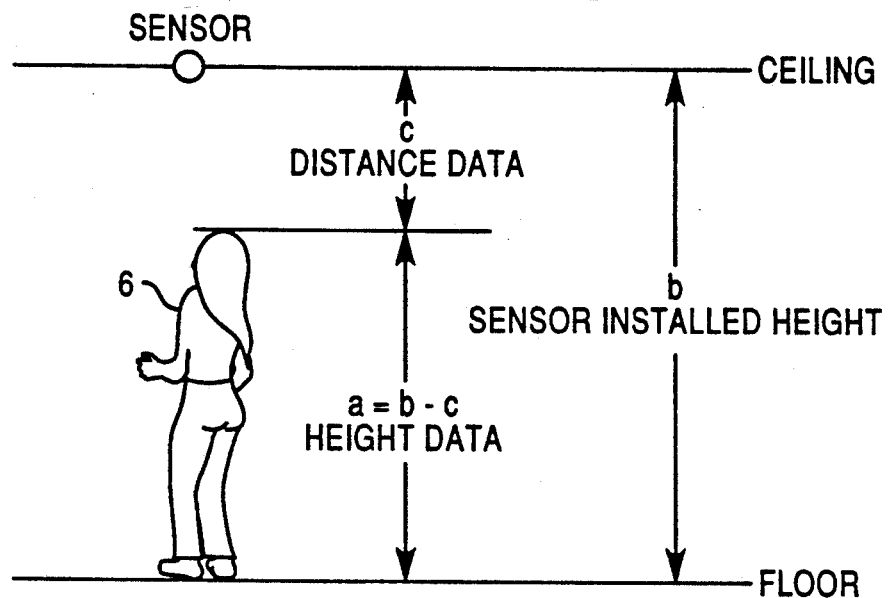
FIG. 5 is a diagram showing the relation among sensors, distance data and height data.
Figure 7:
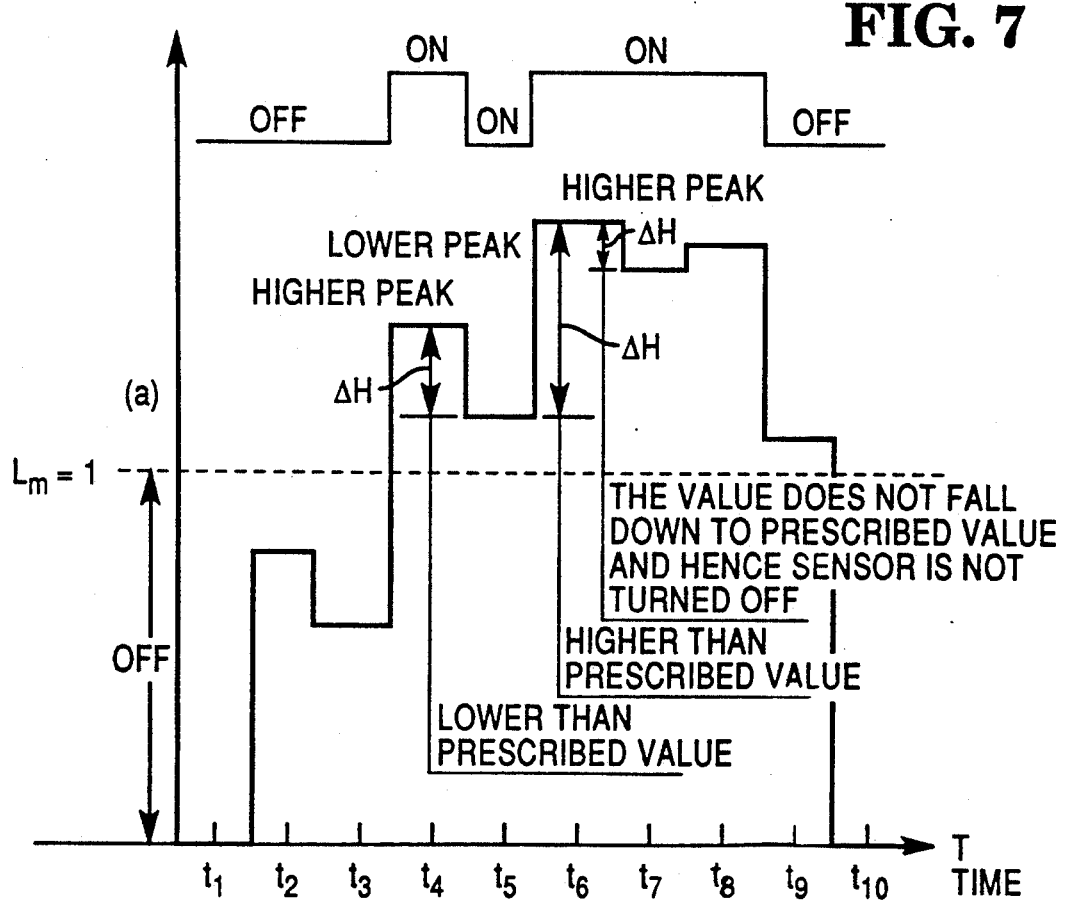
FIG. 7 is a diagram showing a change in ON/OFF state of the sensing switch with time.
Figure 6:
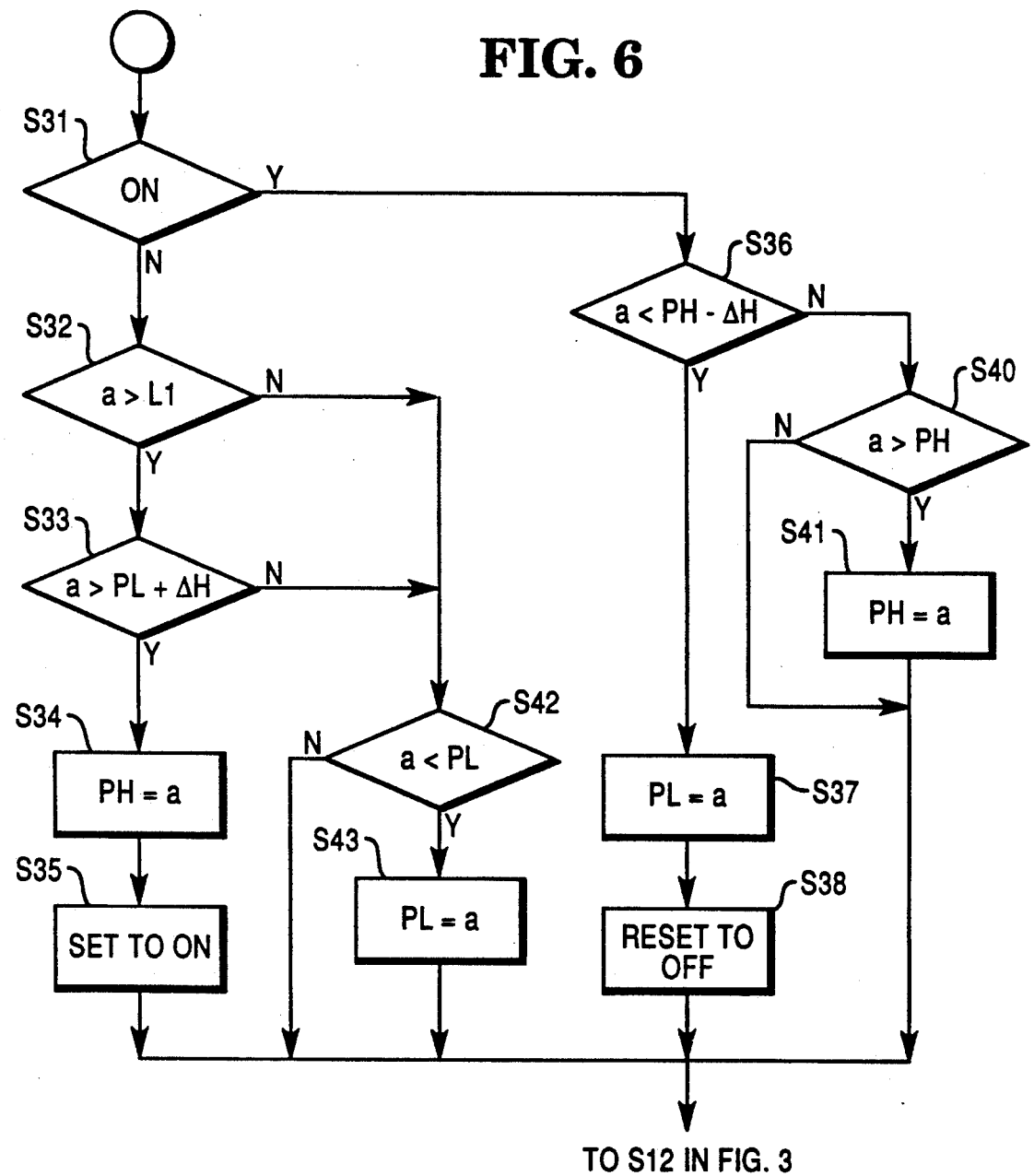
FIG. 6 is a flowchart for updating ON/OFF and peak values of each sensing switch.

FIG. 3 is a flowchart showing the procedures according to the embodiment of the passers-by number counting method of the present invention. FIG. 4 is a block diagram illustrating an embodiment in which the structure in FIG. 2 is shown in more detail and more concretely. FIG. 5 is a diagram showing the relation among the sensor, the distance data and the height data. FIG. 6 is a flowchart of updating ON/OFF state and peak value of each sensing switch. FIG. 7 is a diagram showing time-passing changes of ON/OFF states of the sense switch.

Firstly, as shown in FIG. 3, the height data are collected for each sensor (S10).

As shown in FIG. 5, height data "a" is obtained by subtracting a distance data "c" from a sensor-installed height "b".

The height data "a" is calculated by the sensing section 2, a sensor control section 30 and a height calculating means 32 in FIG. 4 corresponding to the measuring means 12 in FIG. 2.

The sensing section 2 consists of a plurality of ultrasonic transmitters/receivers 4 (hereinafter referred to as sensing devices or sensors) which are lined up in two lines (line A and line B) so as to cross the passage. The sensor control section 30 controls the transmission and reception of ultrasonic waves by the individual sensors 4 in the sensing section 2 in such a manner that in order to measure the distance between each of the sensors 4 and a moving object 6 on the passage to calculate the height "a" of the moving object 6 above the floor level, ultrasonic waves are periodically irradiated from the individual sensors onto the passage or the moving object all at once and waves reflected therefrom are received (hereinafter, the ultrasonic wave irradiation and reflected wave reception for the measurement of the height "a" will be called scan or scanning). The sensor control section 30 controls the scanning operation. The flowchart (S10 to S20) in FIG. 3 shows the procedures to be performed upon each scanning operation.

The function of the height calculating means 32 will be described with reference to FIG. 5. The height calculating means 32 measures the time required after the irradiation of the ultrasonic waves till the reception of the reflected waves upon each scanning operation and calculates the distance "c" between the sensor 4 and an object from which the wave is reflected based on the required time thus measured to reckon the height "a" of the moving object from the resultant distance "c" and the height "b" of the sensor above the floor level. The height "a" thus reckoned is stored in the data memory means 16 as the height data "a". The calculation and storage of the height data is performed for all the sensors.

Decision of Sensing State of Each Sensing Switch

At the completion of collection of the height data "a", the state of each sensing switch is provisionally decided (S11 in FIG. 3). The sensing switch is adapted to indicate the sensing state of each sensor and is provided for each sensor.

The decision of the state of the sensing switch and the detection of the peak values are conducted by provisional deciding means 34, peak detecting means 36, correcting means 38 and updating means 40. The members 36, 38 and 40 correspond to sense deciding means in FIG. 2.

The provisional deciding means 34 is adapted to temporarily decide the state of each sensing switch indicating whether each sensor 4 senses the moving object 6 or not, based on the height data obtained by the latest scanning operation, the peak data stored upon a past scanning operation and the like. The state of the sensing switch is divided into ON state and OFF state. The ON state denotes a state that the sensor 4 senses the moving object to be sensed and the OFF state denotes a non-sensing state. The ON and OFF states are provisionally decided concretely in the following manner.

First, in an initial state, the height (or 0 m) of floor on which no moving object 6 is present is stored in the data memory means as a lower peak value. Then, when the moving object 6 comes within a sensible range, the height data "a" varies. In this case, the minimum height LM or the maximum height is defined in advance in accordance with the object 6 to be counted, by which a child whose height is lower than a predetermined height can be excluded from the objects to be counted or only a child whose height is lower than a predetermined height can be considered as an object to be counted.

Now, it is assumed that the minimum height to be counted is defined to be 1 m. The height data change less than 1m is disregarded. When height data higher than 1m is detected, the provisional deciding operation of the sensing switch is started.

The above mentioned minimum height confirming and provisional deciding operations are performed by provisional deciding means 34 in FIG. 4.

The sensing switch is turned on, when two conditions are satisfied, namely:
1. the height data "a" is higher than the minimum height LM, and
2. the height data "a" is higher than the lower peak value PL by a predetermined value ($\Delta H$).

On the other hand, the sensing switch is turned off when the height data "a" is lower than a higher peak value by the amount more than the predetermined value $\Delta$. The predetermined value $\Delta H$ is defined by using the length from the head top to a shoulder of a person as a reference in order to prevent the fluctuation of sensing state caused by a change in height data "a" owing to unevenness or the like of one person to improve the counting accuracy.

The ON/OFF provisional deciding operation will be described with reference to FIG. 6.

FIG. 6 shows a flowchart of the ON/OFF provisional deciding operation and the peak updating operation to be performed for each sensing switch. First, it is checked to see whether the sensing switch is ON or OFF (S31). If the switch is not in the ON state, it is checked to see whether the height data "a" is higher than the minimum height LM, or L1 or not (S32). If so, it is checked to see whether the height data "a" is higher than the already stored lower peak value PL by the amount more than the value $\Delta H$ or not (S33). If so, the height data "a" obtained at that time is updated to the higher peak value (S34) and thereafter the sensing switch is set to the ON state (S35).

If the sensing switch is ON as a result of the state confirmation (S31) thereof, it is confirmed whether the height data "a" is lower than the higher peak value by the amount more than the value $\Delta H$ (S36). If so, the lower peak value is updated to the height data obtained at that time (S37) and thereafter the sensing switch is reset to the OFF state (S38).

At the completion of the provisional decision of the sensing switch, the higher peak value and lower peak value are updated by peak detecting means 36.

First, the updating operation of the higher peak value will be described. The higher peak value is updated when the following conditions are satisfied: firstly, when the sensing switch is turned ON, the height data "a" obtained at that time is defined as the higher peak value and secondly, when the sensing switch shows no change, if the height data "a" is higher than the already stored higher peak value, the new height data "a" is defined as the higher peak value or if the height data "a" is lower than the already stored higher peak value, the original higher peak value is maintained. The operation will be described with reference to FIG. 6. When the sensing switch is in the OFF state (S31), if the height data "a" is higher than the minimum height LM (S32) and is higher than the lower peak value PL by the amount more than the value $\Delta H$ (S33), the height data "a" is updated to the higher peak value PH (S34). When the sensing switch is ON, it is checked to see whether the height data "a" is higher than the higher peak value PH (S40), and if so, the height data "a" obtained at that time is updated to the higher peak value PH (S41).

Next, updating of a lower peak value will be described with reference to FIG. 6. Firstly, when the sensing switch changes from the ON state to the OFF state (S36), the height data "a" obtained at that time is defined as a lower peak value PL. Secondly, when the sensing switch is remained unchanged, that is, in the OFF state, the height data "a" is compared wit the lower peak value PL (S42), and if the height data "a" is lower than the already stored lower peak value PL, the height data "a" freshly obtained is defined as a new lower peak value PL (S43), or if the height data "a" is higher than the already stored lower peak value PL, the original lower peak value is maintained (S42).

At the completion of the provisional decision of the sensing switch and the updating of the peak values, processes for correcting and deciding the state of the sensing switch are executed (S12 to S13 in FIG. 3) by the correcting means 38.

Firstly, sensors which are arranged in the positions corresponding to each other in the lines A and B of the sensors which are lined up in two front and rear files along the passage are paired and the sensing states of a pair of sensing switches corresponding to the paired sensors are analyzed to perform a first correcting operation. The pair of sensing switches corresponding to the paired sensors will be referred to as a sensor pair. The reason why the sensing states of both sensing switches constituting a sensor pair are analyzed and corrected is that when two front and rear sensing switches are turned ON at the same time, it is necessary to judge whether the sensing switches sensed one person at the same time or the rear switch sensed another person who passed under the switch following the previously passed person. That is, both sensing switches of the sensor pair are turned ON at the same time in cases that (a) one person is in an intermediate position between the front and rear two sensors and (b) one switch is turned ON by sensing the head of the preceding person and the other switch is turned ON by sensing a shoulder of the succeeding person. In the above mentioned case, when the sensing switch on the coming-in side of the sensor pair is in the ON state and the sensing switch on the going-out side of the sensor pair is turned OFF, it cannot be judged whether the reason therefor is that one person went back in the opposite direction in the case (a) or the reason therefor is that the preceding person has passed through under the switch in the case (b). Therefore, in the case (b), the switch which was turned ON as a result of sensing of the shoulder of the succeeding person is forcibly maintained in the OFF state to clearly indicate that the head of the preceding person has passed.

Concretely speaking, when the sensing switches of the front and rear sensors in the lines A and B are in the ON states, the height data of the both sensors are compared with each other, and if one data is higher than the other data by an amount which is more than the predetermined value $\Delta H$, the sensing switch of the lower height data is turned off and a lower peak value of the sensor which is turned OFF is updated to the height data obtained at that time. That is, in a case that one sensing switch of the sensor pair senses the head of a passing person and the other sensing switch of the sensor pair senses a shoulder of the same person (it is assumed that a difference between the head and the shoulder in height is in excess of the value $\Delta H$), the sensing switch of the lower value is turned OFF (In this processing method, in a case that the sensing switch on the coming-in side senses the head of the succeeding person, it cannot be turned OFF. However, a space between the sensors of the sensor pair is considerably narrow, so that it never occurs that the both sensing switches of the sensor pair sense the heads of two persons at the same time). Accordingly, in a case that the state in which both sensing switches are in the ON states is turned to the state in which the sensing switch on the coming-in side is in the ON state and the sensing switch on the going-out side is turned OFF, it is considered that the same one person went back and hence this sensing operation is not counted.

Next, durability of the provisionally decided and corrected state of the sensing switch is checked up by the correcting means 38 (S13 in FIG. 3) in order to exclude the temporary change of the sensing switch induced by unstable factors such as noise, edge detection of a moving object and the like. In this embodiment, the ON state is fixed in one scanning cycle and the OFF state is fixed in two scanning cycles in order to avoid the fluctuation of the sensing switches caused by the unevenness of one same person. The number of scanning operations to be counted required for the decision of the ON and OFF states can be freely set as required in such a manner that the counted number to be maintained is changed by the decision of the sensing switch on the coming-in side and the sensing switch on the going-out side.

The updating means 40 updates the contents in the data memory means 16 based on the states of the sensing switches and the peak values thus decided in the above mentioned manner (S14 in FIG. 3).

Next, the updating of the peak values and the deciding of the sensing state of the sensing switches will be described as time passes with reference to FIG. 7. FIG. 7 shows in a time series the height data "a" collected by one sensor. In FIG. 7, reference numerals t1 to t9 denote times which are partitioned for the convenience of description and actually a plurality of times of scanning operations are performed in one period (in each of the periods t1 to t9). First, assuming that no moving object was detected at the time t1, the height data "a" will be 0 m. Next, it is assumed that at the time a moving object 6 of height lower than 1 m was detected. However, in this case, the height of the moving object 6 does not exceed the minimum height and hence the condition for turning ON the sensing switch is not satisfied, so that the sensing switch remains in the OFF state. At the time t3, due to the unevennes of the moving object 6, the height of the moving object 6, the height of the moving object 6 becomes lower than that obtained at the time t2. However, no change is found in the sensing state and hence the sensing switch still remains in the OFF state.

At the time t4, it is assumed that a moving object 6 of height higher than lm was sensed. Now, the lower peak value is 0 m, so that the height data "a" exceeds the lower peak value by the amount more than the value $\Delta H$ and hence the conditions 1 and 2 for turning the sensing switching ON are satisfied, so that the sensing switch is set to the ON state and the height data now obtained is stored as the higher peak value.

At the time t5, the height data is below the higher peak value by the amount more than the value $\Delta H$, so that the sensing switch is set to the OFF state.

At the time t6, the height data again exceeds the higher peak value by the amount more than the value $\Delta H$, so that the sensing switch is set to the ON state. At the times t7 and t8, the height data "a" slightly fluctuates. However, it will never be below the higher peak value by the amount more than the value $\Delta H$, so that the sensing switch remains in the ON state.

At the time t9, the height data "a" is below the higher peak value by the amount more than the value $\Delta H$, so that the sensing switch is reset to the OFF state.

In this connection, it should be noted that FIG. 6 shows in a time series the change in sensing state of the sensing switch at the individual times (t1 to t9) from the plurality of times of scanning operations, while FIG. 3 shows the flowchart of the procedures of the process which is executed in one scanning cycle of one of the scanning operations.

Preparation of Data on the Number of Passers-by to be Counted

Next, the preparation of the count data will be described.

First, moving direction recognizing means 42 will be described. When any one of the sensing switches (constituting a sensor pair) corresponding to the individual sensors in the equivalent positions in the lines A and B is freshly turned ON, the sensor pair including the sensing switch thus turned ON is registered as an already made an entry (entered) sensor pair and the sensing switch which has been turned ON first in the sensor pair is considered as the one on the coming-in side to judge the moving direction of the moving object (person). This data is utilized in a variety of ways for accumulating the number of passers-by in each moving direction, checking to see whether a moving object 2 has passed under the sensing section 2 or has not passed and has turned back halfway and the like.

The relation between the newly made entry sensor pair and the adjacent sensor pair is analyzed by identity verifying means 46 to verify whether the newly entered sensor pair and the adjacent sensor pair sense the same person or not (S15). If it is recognized that the newly entered sensor pair sensed the same person as the one sensed by the adjacent sensor pair, an identity flag is recorded in a corresponding sensor pair in the data memory means 16.

The reason for the verification of the identity is as follows:

First, it is assumed that the individual sensor pairs are arranged at intervals of about 30 cm so as to cross the passage. Accordingly, when an average adult passes between the sensors, his passing is sensed by two sensor pairs. In this case, this passage should not be counted as two persons but should be counted as one person.

Concretely speaking, when the following two conditions are satisfied at the same time, it is judged that one person was sensed:

1. Already entered two sensor pairs which are adjacent to each other sense persons who enter from the same direction and the sensing switches of the sensors on the coming-in side of the both sensor pairs are in the ON states; and 2. Sensor pairs adjacent to the above mentioned sensor pairs should be the not-yet entered ones or the ones which entered from the opposite direction.

The identity flag is registered when the above mentioned conditions are satisfied.

At the same time, it is verified whether a sensor pair for which the identity flag has already been registered still satisfies the above mentioned condition 2 or not. If so, the flag is maintained as it is, while, if not, the flag is cleared. The contents in the memory means 16 are updated in accordance with results of flag setting and clearing according to the verification of the sensing of one person (S16 in FIG. 3).

Recognition of Passed State (EXIT)

Next it is judged by passing deciding means 44 in FIG. 4 whether the already entered sensor pair indicates the "passed (EXIT)" or not. When one of the following conditions is satisfied, it is judged as EXIT:

1. The sensing switches of both sensors constituting the already entered sensor pair are turned OFF; or 2. the sensing switch on the coming-in side (hereinafter referred to as an "in SS") is ON and the sensing switch on the going-out side (hereinafter, referred to as an "out SS") is OFF, and the in SS and out SS which are arranged immediately before the above mentioned switch are OFF and ON.

The recognition of EXIT will be described with reference to FIG. 8 which shows a flowchart of sensing of EXIT for each sensor pair. First, it is checked to see whether the sensor pair concerned has already been entered or not (S50). If so, it is checked to see whether both sensing switches are OFF or not (S51). If the OFF state lasts for a predetermined period of time (S52), it is considered as EXIT (S53). If both sensing switches are not OFF, it is checked to see whether the "IN SS" is ON and the "OUT SS" is OFF or not (S54) in order to sense the EXIT of the preceding person in the case of (b), that is, in the case that the above mentioned two persons are successively sensed by the sensing switches of the sensor pair. If the condition at S54 is satisfied, it is checked to see whether the states ("IN SS-1" and "OUT SS-1") immediately before the both sensing switches which are in the ON and OFF states are respectively OFF and ON or not (S55). If the states are ON and OFF, it means that one person has turned back and hence it is not recognized as "EXIT". If the states "IN SS-1" and "OUT SS-1" are respectively OFF and ON, it is considered that the preceding person has passed as in the case of (a) and this state is recognized as "EXIT" (S53).

When it is recognized as "EXIT", the data that the sensor pair concerned sensed "EXIT" is written into the data memory means 16 and is transmitted to the count judging means 50 at the same time.

Decision of Number to be Counted

The count judging means 50 receives the EXIT data from the passing deciding means 44 and then decides the number to be counted as the number of passers-by based on the data on the passing direction, the identity flag and the like (S18).

The reason why the number to be counted is decided is that it sometimes happens that a person passes under the sensing section obliquely, many persons pass in a group, a person stretches his arm, or a person stands still, so that the number of passers-by cannot be accurately counted simply in accordance with the sensing state of each sensor pair.

The counted number deciding process is executed centering around the sensor pair which sensed the EXIT state. This process is roughly divided into a case that the identity flag is set up and a case that no identity flag is set up. First, (A) in a case that the identity flag is set up, one is counted for the adjacent two sensor pairs. Then, (B) in a case that no identity flag is set up, the process is further divided into various cases as follows:

(1) A case in which the sensor pairs adjacent to the sensor pair indicative of EXIT (hereinafter referred to as an ESP) are not yet made an entry or sense the approach in the opposite direction;

(2) A case in which the sensor pair indicative of EXIT is included and there are two successive sensor pairs which sense the approach in the same direction as that of the approach sensed by the ESP;

(3) A case in which there are three successive sensor pairs which sense the approach in the same direction as that of the approach sensed by the ESP;

(4) A case in which there are four or more successive sensor pairs which sense the approach in the same direction as that of the approach sensed by the ESP.

The cases (A), and (1) to (4) of the case (B) will be described with reference to FIGS. 9 to 18.

Figure 9:
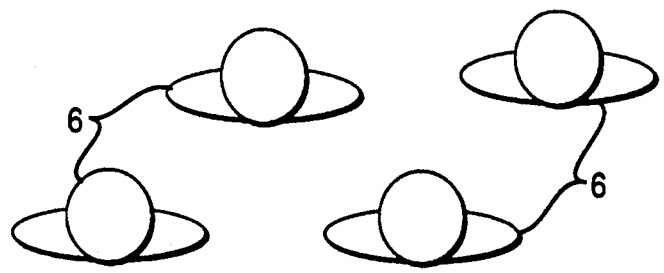
FIG. 9 is a diagram showing the arrangement of individual sensors 4 in the lines A and B.

FIG. 9 shows the arrangement of the individual sensors in the lines A and B. In the drawing, 6 denotes a person who passes under the sensing section 2. FIGS. 10 to 18 show passing manners of persons who pass under the sensing section 2 on the left side and show how the individual sensing switches of the individual sensor pairs change in accordance with the passing manners of persons on the right side.

Counted Number Deciding Processes A and B-(1)

First, the state in FIG. 10 will be described.

Figure 10:
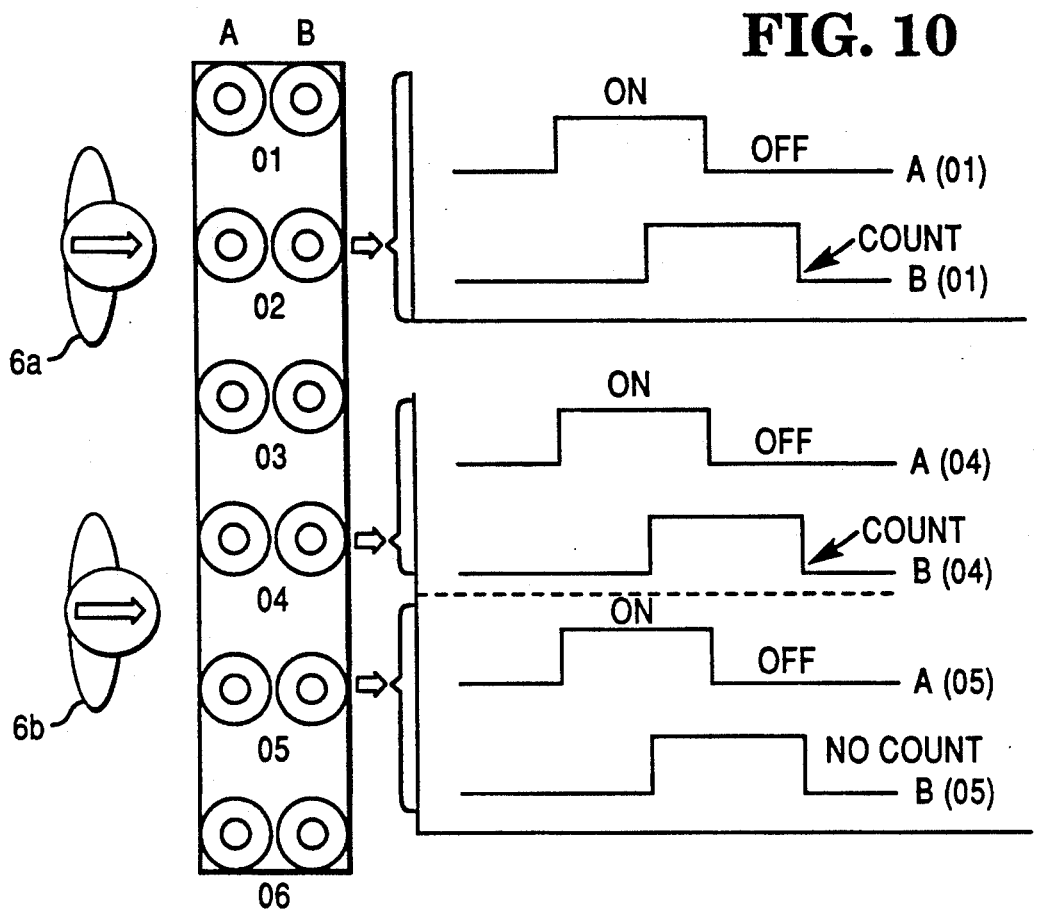
FIG. 10 is a diagram illustrating the counted number deciding process, showing various states of sensing switches when persons pass under the sensing section 2.

In FIG. 10, the upper portion of the figure and the lower portion of the figure respectively show typical examples of the counted number deciding processes (B)-(A) and (A).

When the person 6 passes under the sensing section so as to be sensed only by a sensor pair 02 as shown in the upper picture in FIG. 10, the sensing states of sensing switches A(02) and B(02) of the sensor pair 02 change as shown by the timing chart on the right side. In this case, when the sensing switches of the both sensors constituting the already entered sensor pair (02) are turned OFF at the same time, it is judged as EXIT. In this case, no identity flag is set up and the adjacent sensor pairs (01 and 03) are not yet entered, so that the counted number of passers-by passing from A toward B upon the EXIT is decided to be "1".

Figure 11:
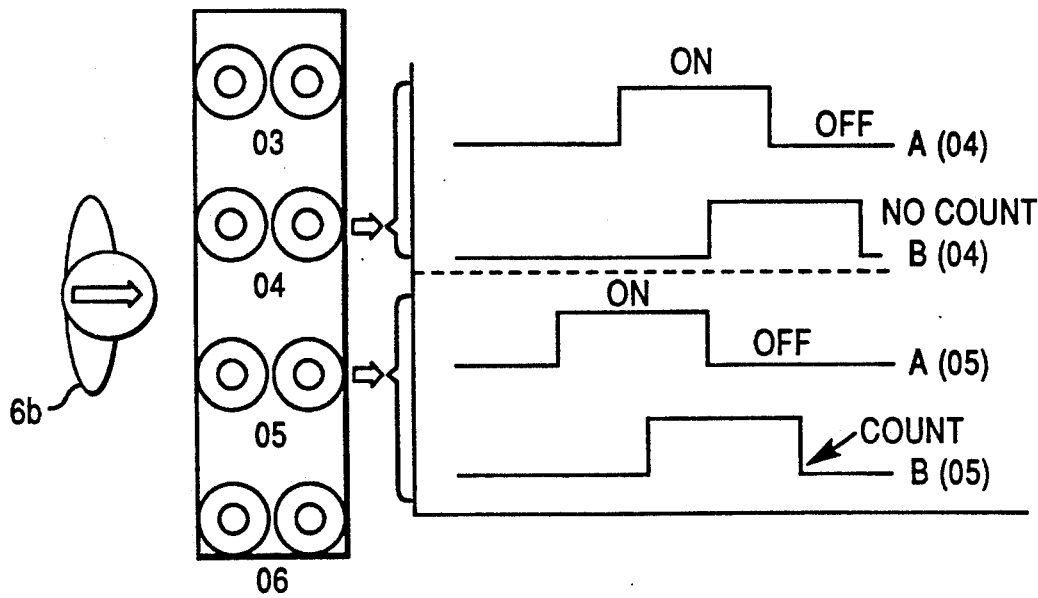
FIG. 11 is a diagram for illustrating the counted number deciding process showing the various states of the sensing switches when a person passes under the sensing section 2.

Next, the cases shown by the lower picture in FIG. 10 and shown in FIG. 11 will be described.

In these cases, a person 6b is passing under two sensor pairs (04 and 05). The timing charts thereof are as shown in FIG. 10 and 11 depending on the sensing timings of right and left sensor pairs. As will be apparent from the timing charts.

1. two sensor pairs (04 and 05) which are adjacent to each other sense persons who come in from the same direction (the line A) and the sensing switches A (04 and 05) in the line A are turned ON at the same time; and 2. sensors pairs (03 and 06) adjacent to the sensor pairs (04 and 05) are not yet entered, so that the two conditions for the setting up of the identity flag are satisfied at the same time.

Accordingly, in these cases, the identity flag is set up at the step (S15) in FIG. 3 and the above mentioned counted number deciding condition (A) is satisfied. That is, when the sensor pair 04 or 05 indicates EXIT first, the counted number "1" is decided and even if one of the sensor pair 04 and 05 indicates EXIT later, no number is counted.

Counted Number Deciding Process (B)-(2)

Figure 12:
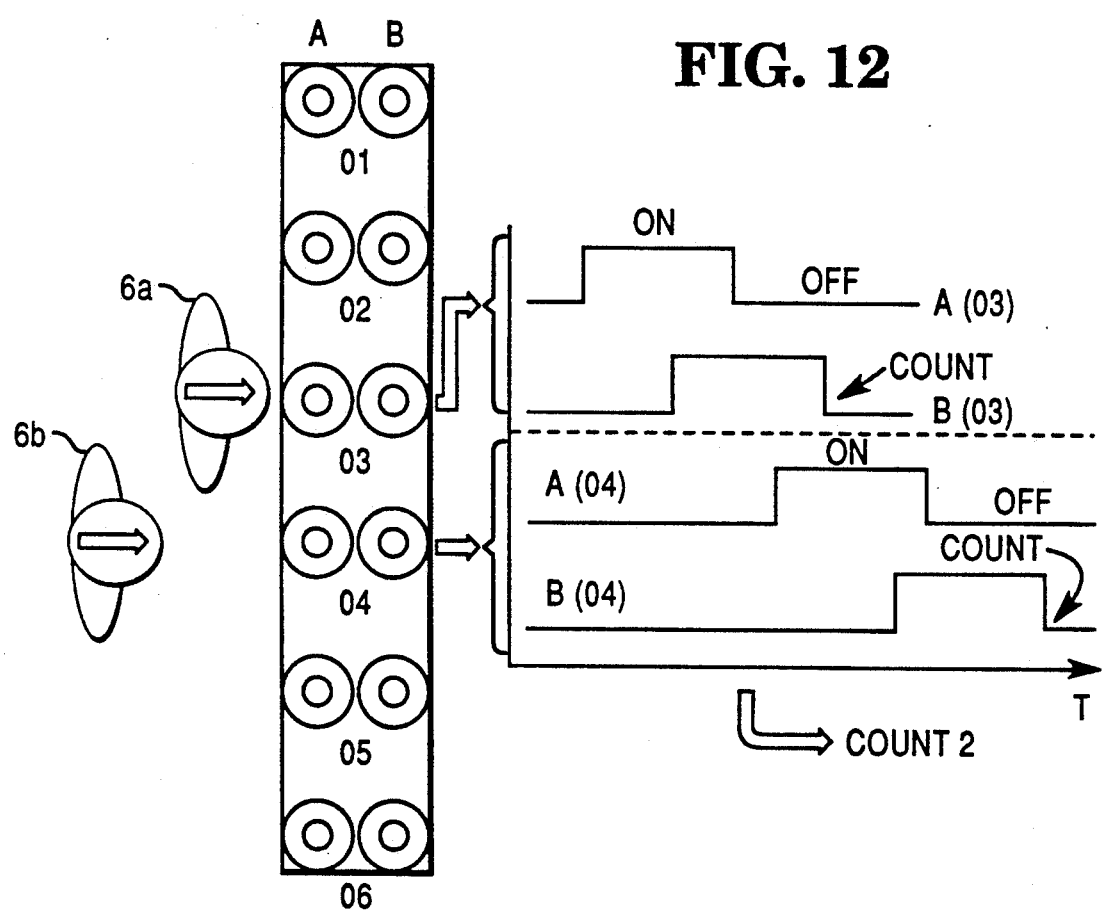
FIG. 12 is a diagram for illustrating the counted number deciding process, showing the various states of the sensing switches when persons pass under the sensing section 2.

Next, a typical example in which two persons 6a and 6b pass under the sensing section 2 will be described with reference to FIG. 12. In this case, the passing of the person 6a causes to turn ON first the sensing switches A(03) and B(03) and then the sensing switches A(04) and B(04). When the sensing switch A(04) is turned ON, the sensing switch A(03) is already in the OFF state. Accordingly, the condition 1 for setting up the identity flag is not satisfied and hence no identity flag is set up. This state corresponds to the case of the above mentioned counted number deciding process (B)-(2). The individual sensor pairs (03) and (04) are separately processed in the following manner.

1. Only "1" is counted as a result of sensing of one person by two sensor pairs. Concretely speaking, by using the sensor pair (03) which indicated EXIT first as a reference, in three cases that (a) the sensing switches of the other sensor pair (04) indicate EXIT at the same time, (b) the sensing switches A(04) and B(04) of the sensor pair (04) are both in the OFF state, and (c) only the sensing switch B(04) is turned ON, "1" is counted only for the sensor pair which indicates EXIT first and nothing is counted even when the other sensor pair (04) indicates EXIT later. That is, the number to be counted is "1" as a whole. The reason why nothing is counted even when the sensing switch B(04) of the sensor pair (04) is turned ON is that the sensing switch B(04) is considered to sense a part of the person who is the same as that sensed by the sensing switches of the sensor pair (03). The state shown in FIG. 12 does not correspond thereto.

2. In cases other than the case 1, every time the individual sensor pairs (03) and (04) indicate EXIT, a number is separately counted (that is, two counts). Accordingly, in the case shown in FIG. 12, "2" is counted.

Counted Number Deciding Process (B)-(3)

Figure 13:
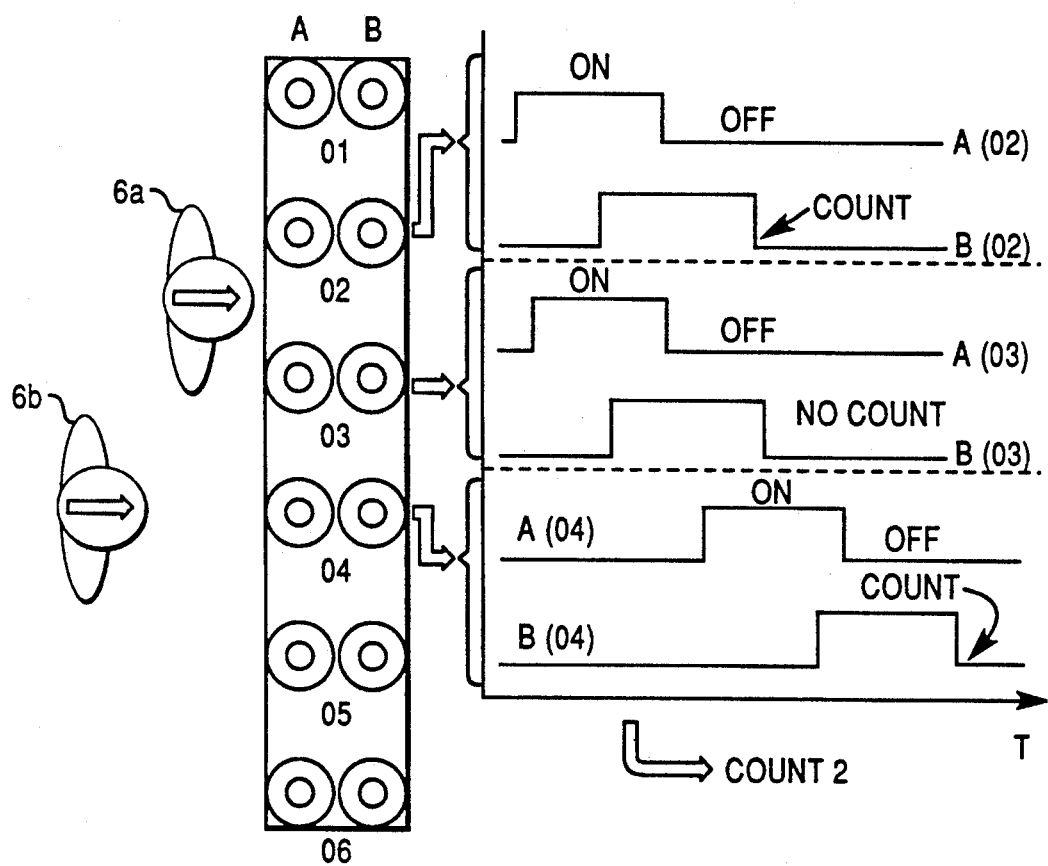
FIG. 13 is a diagram for illustrating the counted number deciding process, showing the various states of the sensing switches when persons pass under the sensing section 2.

Next, the counted number deciding process B-(3) will be described with reference to FIGS. 13, 14 and 15. This process is further divided into the following two cases:

1. a case that a left-most or right-most sensor pair indicates EXIT; and 2. a case that the central sensor pair indicates EXIT. The states shown in FIGS. 13 and 14 correspond to the case 1.

First, FIG. 13 will be discussed. Three sensor pairs (02), (03) and (04) are sequentially entered in accordance with the approach of two persons from the same direction. In this case, the sensor pair (02) at the upper end indicates EXIT first, which corresponds to the case 1 of the process B-(3).

It is checked to see whether the sensor pairs (02) and (03) satisfy the condition which is the same as that in the case 1 of the process B-(2) or not. If so, it is checked to see whether the sensor pairs (03) and (04) satisfy the same condition as the above, or not. Then, if only the sensor pair (03) satisfies the condition, "1" is counted for two sensor pairs (02) and (03) and with respect to the remaining sensor pair (04), the counted number is decided when the sensor pair (04) or the adjacent sensor pair (05) indicates EXIT yielding to normal conditions. If both the sensor pairs (03) and (04) satisfy the above mentioned condition B-(2) 1, "1" is counted for the sensor pairs (02), (03) and (04). If any of the sensor pairs (3) and (04) do not satisfy the above mentioned condition B-(2) 1, "1" is counted only for the sensor pair indicating EXIT and the counted number is decided for the remaining sensor pairs (03) and (04) when the sensor pairs respectively indicate EXIT yielding to normal conditions. In FIG. 13, only the sensor pair (03) satisfies the condition B-(2) 1, so that "1" is counted for the sensor pairs (02) and (03) and thereafter "1" is further counted when the sensor pair (04) indicates EXIT, that is, "2" is counted as a whole.

Figure 14:
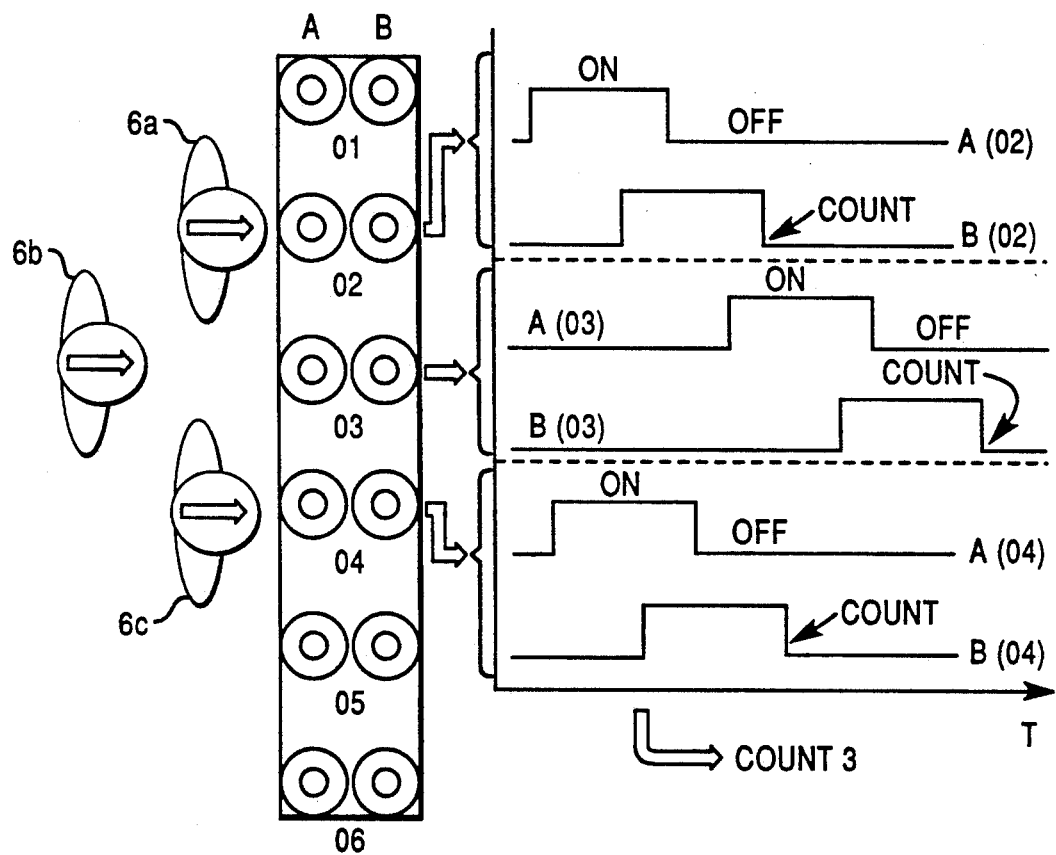
FIG. 14 is a diagram for illustrating the counted number deciding process, showing the various states of the sensing switches when persons pass under the sensing section 2.

Also in FIG. 14, the sensor pairs at both ends indicate EXIT, so that this state corresponds to the condition B-(3) 1. It is recommended to determine in advance priority order in preparation for simultaneous indication of EXIT by the sensor pairs at both ends.

After what should be set as a standard has been decided, the counted number is fixed in the same manner as that in FIG. 10. In the case shown in FIG. 14, the central sensor pair (03) does not satisfy the condition B-(2) 1, so that "1" is counted for each sensor pair, that is, "3" is counted as a whole.

Next, a case in which the central sensor pair indicates EXIT first, that is, the case under the condition B-(3) 2 will be described with reference to FIG. 15. As shown in FIG. 15, three persons are passing under the sensing section in a group, one following on the heels of the other and parting right and left. In this case, the sensor pair (03) is brought into the entry state by the person 6a first and then the sensor pairs (02) and (03) are brought into the entry states almost at the same time by the right and left persons 6b and 6c. Then when the sensor pair (03) indicates EXIT, the above mentioned deciding process condition (B)-(3) 2 is satisfied. In this case, by using the central sensor pair (03) as a standard, it is separately checked to see whether the right and left sensor pairs (02) and (03) satisfy the condition B-(2) 1 or not. If not, "1" is counted every time each sensor pair indicates EXIT yielding to the normal condition, that is, "3" is counted as a whole. When only one of the sensor pair satisfies the condition, "2" is counted as a whole. If both sensor pairs satisfy the condition, the heights of both persons are checked up. The reason therefor is that when a person who has a splendid physique passes under the sensor, while even when two persons who have not so splendid physiques pass under the sensor closely to each other, three sensor pairs simultaneously detect the person(s) and hence the number of passers-by cannot be determined simply in accordance with the number of the sensor pairs which detected the person(s).

Concretely speaking, higher peak values measured by sensors on the both sides of three sensor pairs are compared with one another, and when the central one is the highest, "1" is counted, or otherwise "2" is counted.

Figure 15:
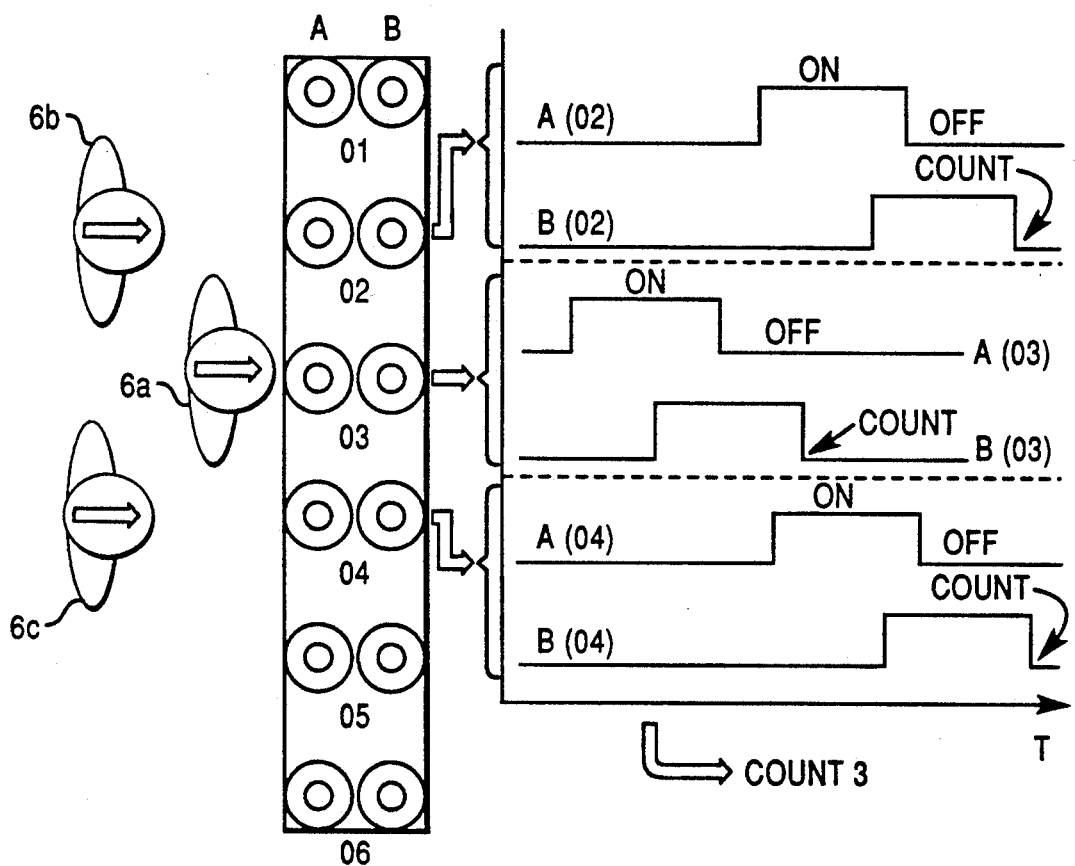
FIG. 15 is a diagram for illustrating the counted number deciding process, showing the various states of the sensing switches when persons pass under the sensing section 2.

In the example shown in FIG. 15, neither the sensor pair (02) nor the sensor pair (04) satisfies the condition, so that "1" is counted for each EXIT and hence "3" is counted as a whole.

Counted Number Deciding Process B-(4)

Next, a case that four or more persons successively come near the sensing section from the same direction will be described with reference to FIGS. 16 and 17.

Basically, in this case, the relation between the adjacent sensor pairs is checked up to confirm whether the sensor pairs which are adjacent to each other sense one person at the same time or not to decide the number counted.

Figure 16:
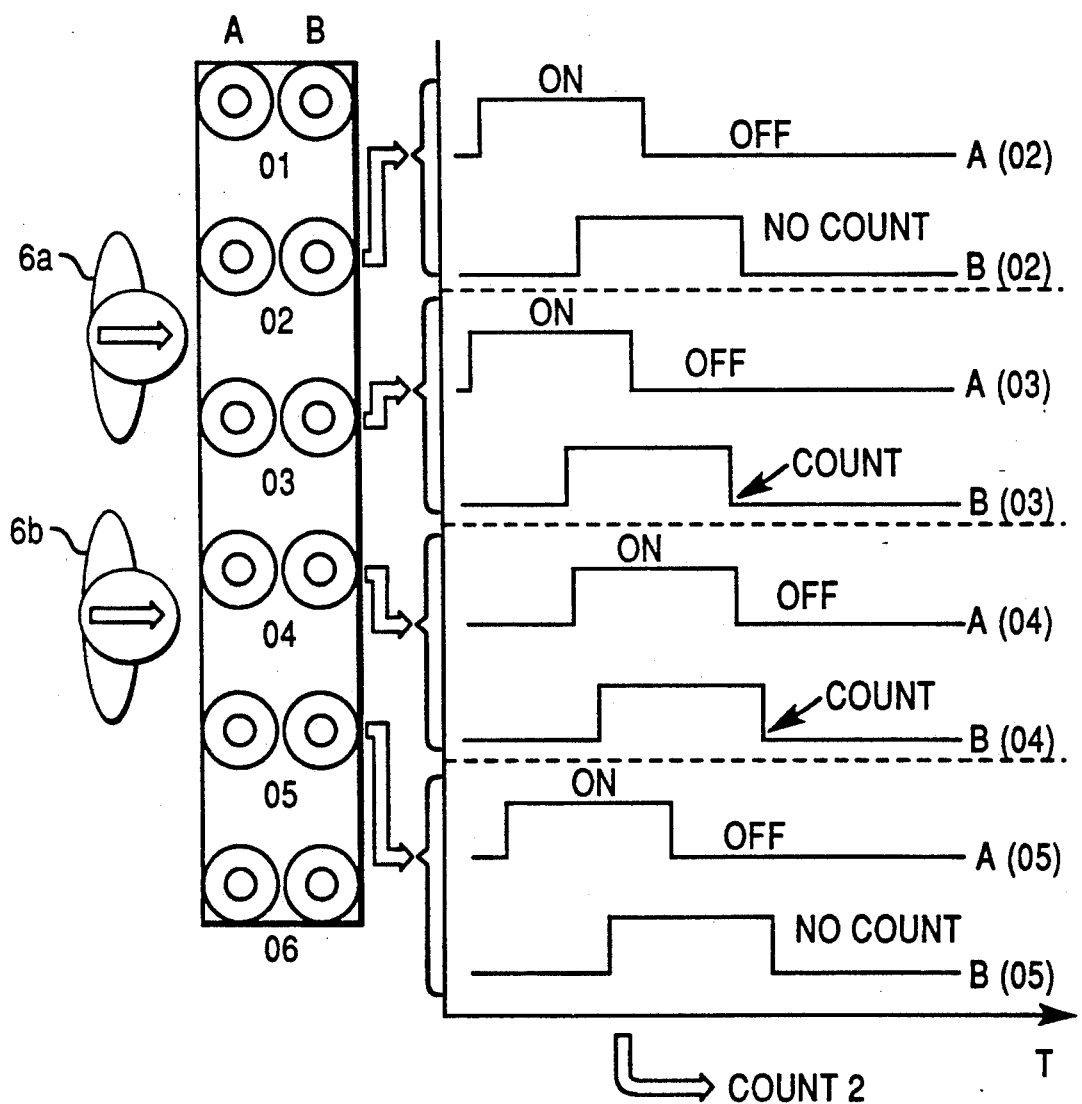
FIG. 16 is a diagram for illustrating the counted number deciding process, showing the various states of the sensing switches when persons pass under the sensing section 2.
Figure 17:
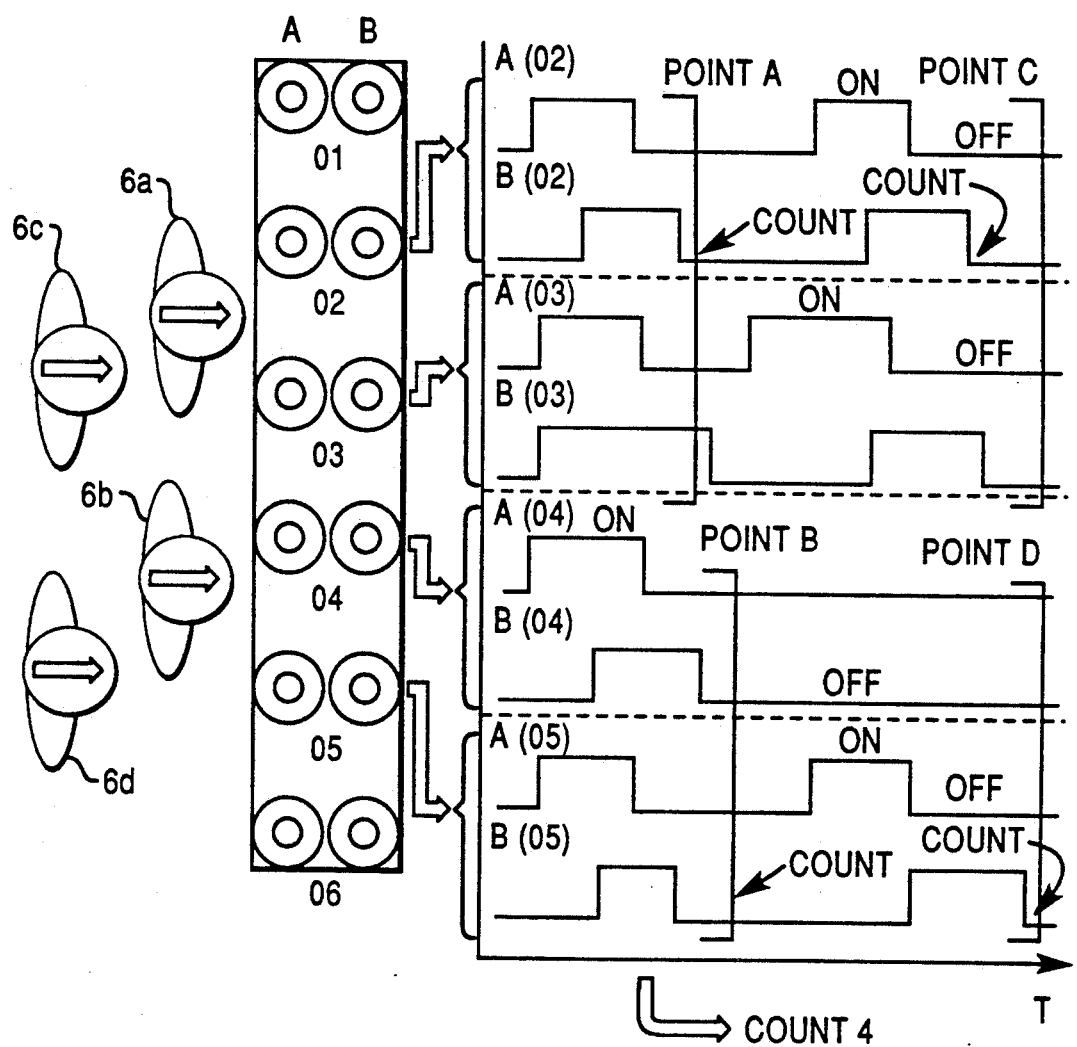
FIG. 17 is a diagram for illustrating the counted number deciding process, showing the various states of the sensing switches when persons pass under the sensing section 2.

In FIG. 16, if the sensor pair (03) indicates EXIT the sensor pair (02 or 04) which is adjacent to the sensor pair (03) is in the entry state, the relation between the sensor pair (03) and the sensor pair (02 or 04) is checked up. When, if the adjacent two sensor pairs (02, 03) or (03, 04) satisfy the condition B-(2) 1, "1" is counted for two sensor pairs. In this process, it can be thought that both adjacent sensor pairs are in the entry states, so that it is recommended to determine in advance the order of priority such that a sensor pair of a smaller number is checked up first.

In FIG. 16, the sensor pairs (02) and (04) which are adjacent to the sensor pair (03) are in the entry states, so that the relation between the sensor pair (03) and the sensor pair (02) of the smaller number is checked up. Now, the sensor pairs (02) and (03) satisfy the condition B-(2) 1, so that "1" is counted for two sensor pairs. On the other hand, if the sensor pairs do not satisfy the condition, the sensor pair (02) which has already been checked up is processed yielding to the normal condition and the relation between the ESP (03) and the sensor pair (04) which is adjacent thereto is checked up. If these sensor pairs satisfy the condition "1" is also counted for two sensor pairs. On the other hand, if these sensor pairs do not satisfy the condition, the relation between the sensor pairs (05) and (04) is confirmed. If the sensor pairs (04) and (05) do not satisfy the condition, the sensor pair (04) is processed yielding to the normal condition. Likewise, the relation between the sensor pairs (05) and (06) which are in the entry states is sequentially confirmed. If these sensor pairs do not satisfy the condition, neither the confirmation of interrelation between the sensor pairs nor counting-up is performed for the sensor pairs concerned.

In FIG. 16, the sensor pairs (03) and (02) satisfy the condition, so that "1" is counted for these sensor pairs, and the sensor pairs (04) and (05) satisfy the condition, so that "1" is also counted for these sensor pairs. That is, "2" is counted as a whole.

A case that four persons pass under the sensing section in a group will be described with reference to FIG. 17. In this case, four consecutive sensor pairs (02, 03, 04 and 05) are brought into the entry states by the approach of two persons in the front row, so that it is apparent that this state corresponds to the state of the counted number deciding process B-(4). In this case, the sensor pairs (02) and (03) satisfy the predetermined condition, so that "1" is counted for two sensor pairs (point A). Likewise, "1" is counted for the sensor pairs (04) and (05) (point B). Accordingly, the number to be counted for two persons in the front row is "2". Next, as is apparent from FIG. 17, the sensor pairs (02, 03 and 05) are brought into the entry states in accordance with the passing of two persons 6c and 6d in the rear row. The sensor pairs (02) and (03) satisfy the condition B-(2) 1, so that "1" is counted for two sensor pairs (02) and (03). Sensor pair (05) satisfies the condition B-(1), so that "1" is counted therefor. Accordingly, the number to be counted for two persons in the front row is "2" and the number to be counted for two persons in the rear row is also "2". That is, the total number to be counted is "4" which corresponds to the number of passers-by.

Figure 18:
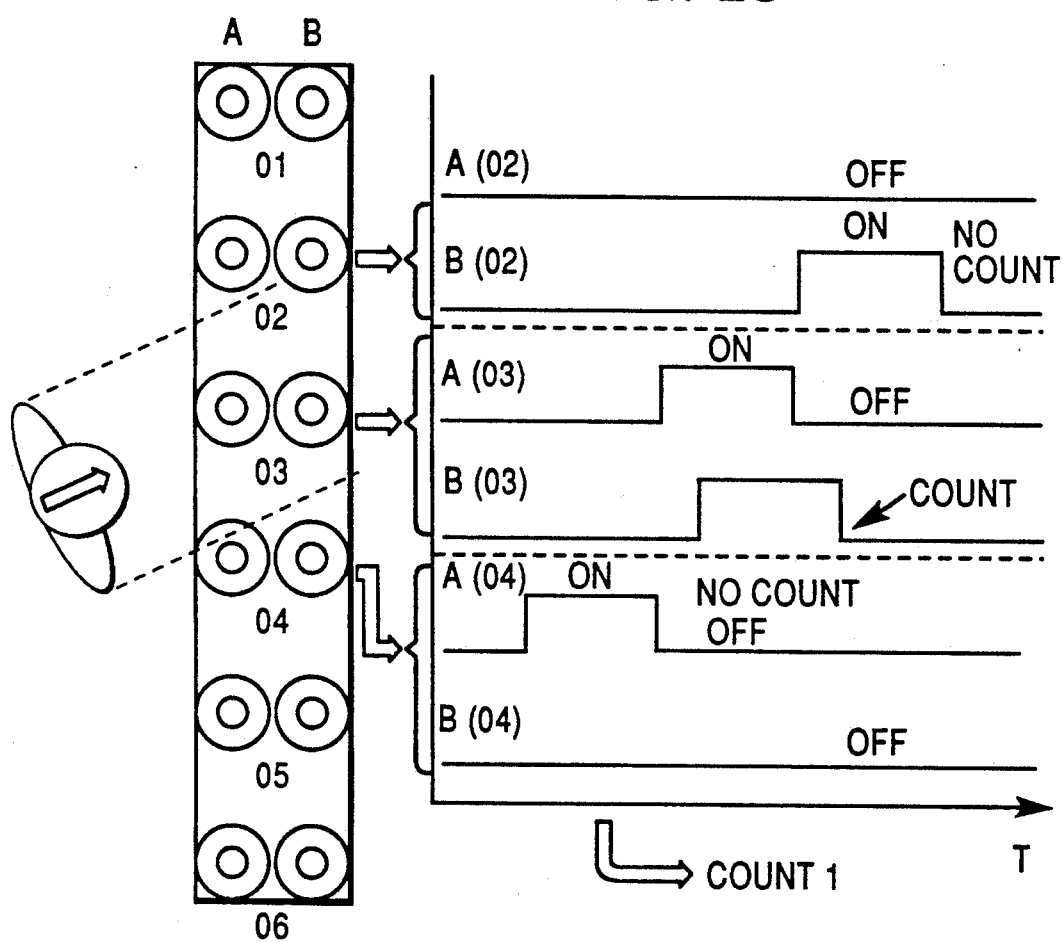
FIG. 18 is a diagram for illustrating the counted number deciding process, showing the various states of the sensing switches when a person passes under the sensing section 2.

Next, a case that a person passes obliquely under the sensing section 2 will be described with reference to FIG. 18. In this case, the sensing switch A(04) of the sensor pair (04) is turned ON, first, and then the sensing switches A(03) and B(03) of the sensor pair (03) are turned ON and the sensing switch B(02) of the sensor pair (02) is turned ON. Only one of the sensing switches of each of the sensor pairs (04, 02) is turned ON and then turned OFF before the other sensing switch is turned ON, so that it is considered that the person who passed under the sensor pairs (04, 02) temporarily came within the detection range and then went out in a direction of approach without passing under the sensing section, that is, his passing is not considered as EXIT to be counted. Accordingly, only the sensor pair (04) indicates EXIT, and "1" is counted.

Counting and Outputting of the Number of Passers-by

The counted number which is decided by the counted number deciding means 50 is sent to the counting means 20 in which, then, the number is counted in accordance with the moving direction of a person (S19). The number of coming-in persons and the number of going-out persons are respectively accumulated. The data obtained are processed in such a variety of ways that, for example, the number of persons who are now in the store is calculated from a difference between the coming-in and going-out persons, into useful data. How to process the data can be appropriately selected as required. The data thus counted are output from the outputting means 22 such as a display, a printer or the like.

At the completion of the counting operation, the sensor pairs which indicate EXIT are initialized for the next passing of person(s) and processes such as a process of prohibiting the counting operation for the remaining sensor pairs which are considered to sense one person at the same time are executed (S20).

As has been described above, according to the present invention, the presence or absence of an object to be measured and the number to be counted are decided in accordance with a change in sensed position, a change in sensed height and the interrelation therebetween, by which the necessity to analyze the lateral height data of a sensor and to detect the height of the head top from the height of a shoulder and the height of the head as in the prior art can be eliminated and hence the sensors can be arranged at considerably wider intervals than in the prior art. In addition, the change in sensed position, the interrelation between individual sensors and the like are synthetically analyzed to decide the number to be counted, so that even when a plurality of persons pass under the sensors in a group, or a person passes obliquely, the number can be counted with a high degree of accuracy.

While the form of the invention shown and described herein is admirably adapted to fulfill the objects primarily stated, it is to be understood that it is not intended to confine the invention to the form or embodiment disclosed herein, for it is sucseptible of embodiment in various forms within the scope of the appended claims.

What is claimed is:

1. A method of counting the number of passers-by who pass through a predetermined region using a plurality of sensors arranged in pairs, each sensor having a sensing switch associated therewith for indicating the sensing state of each sensor, comprising the following steps:

collecting height data relating to passers-by from each sensor;

provisionally determining the condition of the sensing switches and updating peak data stored in a memory;

correcting the sensing state of the sensing switches and re-updating the peak data;

updating counts in the data memory;

verifying whether a newly entered sensor pair and an adjacent sensor pair sense one person or not;

updating an identity flag for an already entered sensor pair;

determining whether an entered sensor pair indicates an exit condition;

determining the number to be counted in accordance with the interrelation between adjacent sensor pairs for an exit;

counting a number in accordance with the moving direction of a passer-by; and initializing the sensor pairs which indicate exit.

2. The method of claim 1, also including the step of checking the state of the sensing switches in order to exclude a temporary change in the state of the sensing switches.

3. The method of claim 1, in which the step of collecting height data comprises the subtraction of distance data obtained by a sensor from a distance between the sensor and a floor surface of the predetermined region.

4. The method of claim 1, in which the step of updating counts in the data memory is based upon the states of the sensing switches and the updated peak data.

5. The method of claim 1, in which the individual sensor pairs are arranged at intervals of about 30 centimeters across the top of said predetermined region.

6. The method of claim 1 in which the method is implemented by a combination of a measuring means having a sensing section, a deciding means coupled to the measuring means, a count judging means coupled to the deciding means, a counting means coupled to the count judging means, an outputting means coupled to the counting means, and a data memory means coupled to the measuring means, the deciding means and the count judging means.

7. The method of claim 6, in which the deciding means comprises peak detecting means, correcting means coupled to said peak detecting means, and updating means, to which both peak detecting means and correcting means are coupled.

8. The method of claim 1, in which the sensors are ultrasonic transmitters/receivers.

9. The method of claim 1, in which the sensors are aligned in two lines extending transversely across the predetermined region.

* * * * *